(12) United States Patent
Aghili

(10) Patent No.: US 8,994,308 B2
(45) Date of Patent: Mar. 31, 2015

(54) METHOD AND APPARATUS FOR IMPROVING OUTPUT OF A MULTI-WINDING MOTOR

(71) Applicant: Farhad Aghili, Quebec (CA)

(72) Inventor: Farhad Aghili, Quebec (CA)

(73) Assignee: Canadian Space Agency, St. Hubert, QC (CA)

( * ) Notice: Subject to any disclaimer, the term of this patent is extended or adjusted under 35 U.S.C. 154(b) by 102 days.

(21) Appl. No.: 13/624,270

(22) Filed: Sep. 21, 2012

(65) Prior Publication Data

US 2014/0084833 A1 Mar. 27, 2014

(51) Int. Cl.
G05B 5/00 (2006.01)
H02H 7/08 (2006.01)

(52) U.S. Cl.
USPC .......................................................... 318/453

(58) Field of Classification Search
CPC ............................... H02P 29/02; B60L 3/0023
USPC .......................................................... 318/453
See application file for complete search history.

(56) References Cited

U.S. PATENT DOCUMENTS

| | | | |
|---|---|---|---|
| 4,651,067 A | 3/1987 | Ito et al. | |
| 5,191,269 A | 3/1993 | Carbolante | |
| 5,196,771 A | 3/1993 | Naito | |
| 5,357,181 A | 10/1994 | Mutoh et al. | |
| 5,672,944 A | 9/1997 | Gokhale et al. | |
| 5,821,725 A | 10/1998 | Wang et al. | |
| 7,339,346 B2 | 3/2008 | Ta et al. | |
| 7,498,761 B2 * | 3/2009 | Iwashita et al. | 318/727 |
| 2011/0074323 A1 | 3/2011 | Mukai | |
| 2011/0074333 A1 | 3/2011 | Suzuki | |
| 2011/0156629 A1 | 6/2011 | Satou et al. | |
| 2012/0001573 A1 | 1/2012 | Kimpara et al. | |
| 2012/0050922 A1 * | 3/2012 | Yamai et al. | 361/31 |
| 2012/0145472 A1 * | 6/2012 | Imamura et al. | 180/446 |
| 2013/0077194 A1 * | 3/2013 | Hasan et al. | 361/31 |

FOREIGN PATENT DOCUMENTS

| | | | |
|---|---|---|---|
| JP | 2861680 B2 | 2/1999 | |
| JP | 3683382 B2 | 8/2005 | |
| JP | 2011-078221 A | 4/2011 | |
| JP | 2011-078230 A | 4/2011 | |

(Continued)

OTHER PUBLICATIONS

Aghili et al. "A Modular and High-Precision Motion Control System with an Integrated Motor", IEEE/ASME Trans. on Mechatronics, vol. 12(3), p. 317-329, 2007.

(Continued)

*Primary Examiner* — Erick Glass
(74) *Attorney, Agent, or Firm* — Jason E. J. Davis

(57) ABSTRACT

A technique for controlling drive currents to respective windings of a multi-winding brushless motor comprises monitoring an output of the motor and a demand of the motor, determining whether a failure mode has occurred, the failure mode being an instantaneous complete or partial failure to generate demanded output; and, upon detection of a failure mode on a first winding, distributing a demand contribution that is not being produced by the first winding to one or more of the windings that are not in a failure mode. The demand may be torque demand, and the failure modes may include winding failure, and voltage and/or current saturation. Improved torque output is generated by the redistribution of demand among phases in the event of a failure mode.

50 Claims, 7 Drawing Sheets

(56) References Cited

FOREIGN PATENT DOCUMENTS

| JP | 2011-131860 A | 7/2011 |
|----|---------------|--------|
| WO | 2010/109528 A1 | 9/2010 |

OTHER PUBLICATIONS

Aghili et al., "Experimental Characterization and Quadratic Programming-Based Control of Brushless-Motors", IEEE Trans. on Control Systems Technology, vol. 11(1), p. 139-146, 2003.

Aghili F., "Fault-Tolerant Torque Control of BLDC Motors", Power Electronics, IEEE Transactions on, vol. 26(2), p. 355-363, 2011.

Aghili F. "Optimal and Fault-Tolerant Torque Control of Servo Motors Subject to Voltage and Current Limits", IEEE/ RSJ International Conference on Intelligent Robots and Systems, p. 3784-3791, San Francisco CA, Sep. 25-30, 2011.

EL-Refaie et al., "A Simple Model for Flux Weakening in Surface pm Synchronous Machines Using Back-to-Back Thyristors" Power Electronics Letters, IEEE, vol. 2(2), p. 54-57, 2004.

English abstract of JP2007388, published Jan. 14, 1987, Matsushita Electric Ind. Co. Ltd.

French et al., "Direct Torque Control of Permanent Magnet Drives", IEEE Trans. on Industry Applications, vol. 32(5), p. 1080-1088, 1996.

Grabner et al., "Nonlinear Feedback Control of a Bearingless Brushless dc Motor", Mechatronics, IEEE/ASME Transactions on, vol. 15(1), p. 40-47, 2010.

Jahns M., "Flux-Weakening Regime Operation of an Interior Permanent-Magnet Synchronous Motor Drive", Industry Applications, IEEE Transactions on, vol. IA-23(4), p. 681-689, 1987.

Kang et al., "New Direct Torque Control of Induction Motor for Minimum Torque Ripple and Constant Switching Frequency", IEEE Trans. on Industry Applications, vol. 35(5), p. 1076-1082, 1999.

Kuhn et al., "Nonlinear Programming", in Proc. Second Berkeley Symposium on Mathematical Statistics and Probability, Berkeley: University of California Press, p. 481-492, 1951.

Lee et al., "Minimization of Higher Back-emf Harmonics in Permanent Magnet Motor Using Shape Design Sensitivity with b-Spline Parameterization", Magnetics, IEEE Transactions on, vol. 39(3), p. 1269-1272, 2003.

Matsui et al., "Autocompensation of Torque Ripple of Direct Drive Motor by Torque Observer", IEEE Trans. on Industry Application, vol. 29(1), p. 187-194, 1993.

Moseler et al., "Application of Model-Based Fault Detection to a Brushless dc Motor", Industrial Electronics, IEEE Transactions on, vol. 47(5), p. 1015-1020, 2000.

Murai et al., "Torque Ripple Improvement for Brushless dc Miniature Motors", Industry Applications, IEEE Transactions on , vol. 25(3), p. 441-450, 1989.

Ozturk et al., "Direct Torque and Indirect Flux Control of Brushless dc Motor", Mechatronics, IEEE/ASME Transactions on, vol. 16(2), p. 351-360, 2011.

Park et al., "A New Approach for Minimum-Torque-Ripple Maximum-Efficiency Control of BLDC Motor", IEEE Transactions on Industrial Electronics, vol. 47(1), p. 109-114, 2000.

Schiferl et al., "Power Capability of Salient Pole Permanent Magnet Synchronous Motors in Variable Speed Drive Applications", Industry Applications, IEEE Transactions on, vol. 26(1), p. 115-123, 1990.

Sebastien et al., "Operating Limits of Inverter-Driven Permanent Magnet Motor Drives", Industry Applications, IEEE Transactions on, vol. IA-23(2), p. 327-333, 1987.

Sneyers et al., "Field Weakening in Buried Permanent Magnet ac Motor Drives", Industry Applications, IEEE Transactions on, vol. 1A-21(2), p. 398-407, 1985.

Taylor D., "Nonlinear Control of Electric Machines: An Overview", IEEE Control Systems Magazine, vol. 14(6), p. 41-51, 1994.

Tsai et al., "Microbrushless dc Motor Control Design Based on Real-Coded Structural Genetic Algorithm", Mechatronics, IEEE/ASME Transactions on, vol. 16(1), p. 151-159, 2011.

Wang et al., "Dissipative Hamiltonian Realization and Energy-Based L2-Disturbance Attenuation Control of Multimachine Power Systems", IEEE Trans. on Automatic Control, vol. 48(8), p. 1428-1433, 2003.

Xu et al., "A Variable Structure Torque and Flux Controller for a DTC IPM Synchronous Motor Drive", in IEEE 35th Annual Power Electronics Specialists Conference, PESC 04., vol. 1, p. 445-450, 2004.

\* cited by examiner

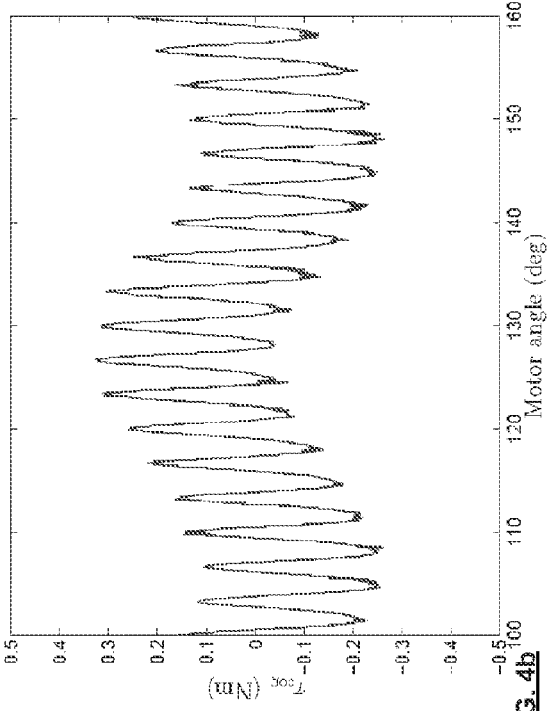
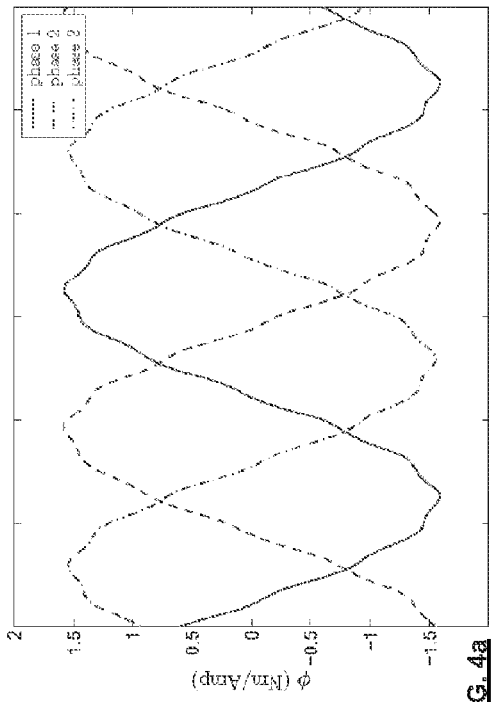
FIG. 4a
FIG. 4b
FIG. 4c

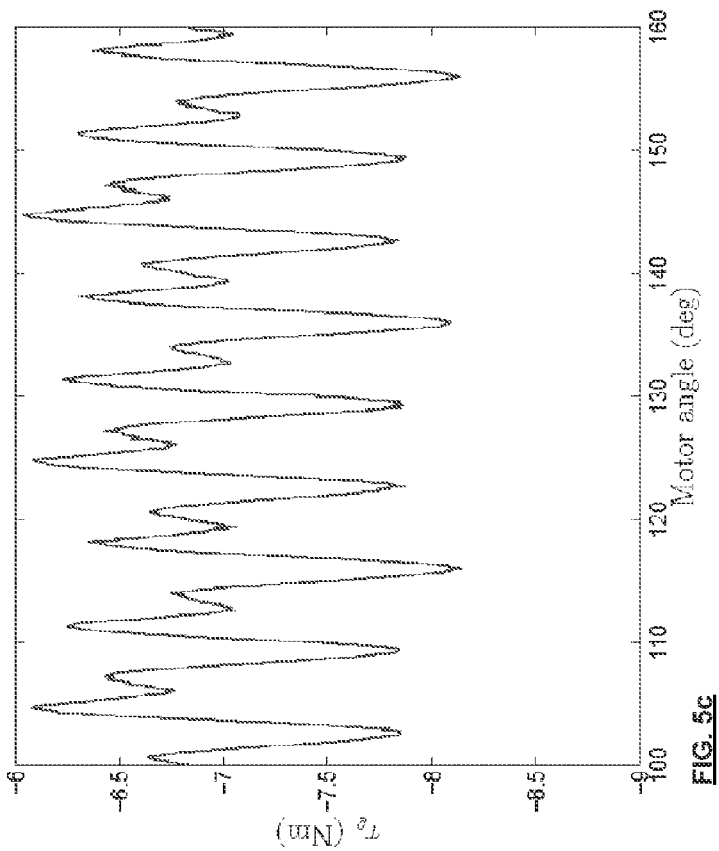
FIG. 5c
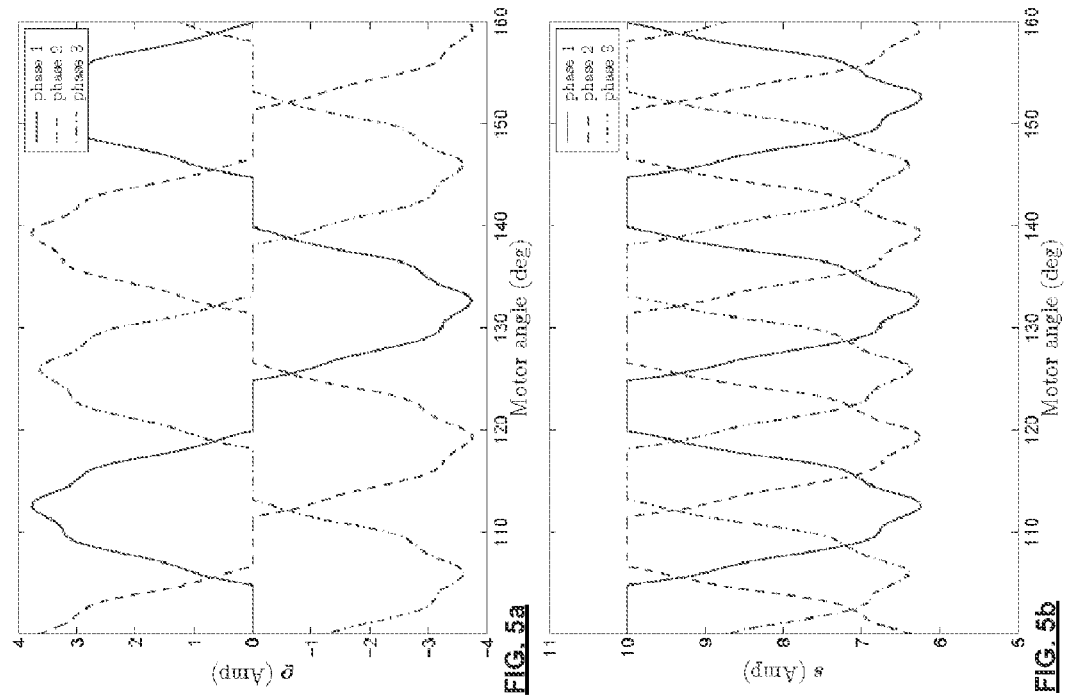
FIG. 5a
FIG. 5b

METHOD AND APPARATUS FOR IMPROVING OUTPUT OF A MULTI-WINDING MOTOR

FIELD OF THE INVENTION

The present invention relates in general to multi-winding brushless motors, and in particular to a controller for a multi-winding brushless motor that, in operation, detects a failure mode on at least one winding at an instant, and dynamically redistributes the drive currents of the other windings in order for continuous accurate torque production.

BACKGROUND OF THE INVENTION

Multi-winding brushless motors are commonly used as the drives of servo systems in a wide range of industrial applications from robotics and automation to aerospace and military. Accurate and ripple-free torque control of brushless motors is essential for precision control of such servo systems, and to avoid vibration in other applications.

In multi-winding brushless motors, electric power is distributed by an electronic controller (electronically controlled commutation system) to a plurality of windings, each delivering power to the motor during a respective phase (range of angular positions), of the motor. Conventional electronic controllers incorporate feedback from the rotor angular position. These are typically analog feedback circuits, although digital controllers are increasingly being used for flexibility and simplified control depending on operating requirements.

The basic function of the controller is to independently excite the windings of the motor to rotate the magnetic field generated by the windings, to rotate the rotor. Thus the controller is coupled by respective drive circuits to the windings. While most multi-winding brushless motors incorporate the windings in the stator, it is possible, though usually inconvenient, to locate windings in the rotor, and its logically possible to include windings on both the stator and rotor. The multi-winding brushless motors may divided into AC and DC motors, where the power input is characterized, or by a mechanism for imparting motion given the magneto-motive field (e.g. a permanent magnet, a reluctance-based material, inductive coil). Electrically commutated, multi-winding, motors, such as brushless DC motors, including permanent magnet synchronous motors, switched reluctance motors, and induction motors, require such a controller.

Conventional controllers excite respective windings with approximately sinusoidal current waveforms for smooth motor operation. However, non-ideal motors do not generate a perfectly sinusoidally distributed magneto-motive force from a sinusoidal current waveform excitation, and so a sinusoidal excitation applied to a non-idea motor can result in torque ripple. Torque ripple, a well known problem in the art, is a cyclic variation in the torque output of a motor.

It is well known that suppressing the torque ripple of the motor drive of a servo system can significantly improve system performance by reducing speed fluctuations[1,2]. Commercial high-performance electric motors reduce the pulsating torque by increasing a number of motor poles. However, such motors tend to be expensive, heavy, and bulky due to construction and assembly of multiple windings, rotor poles, the attendant drive circuits, etc.

Control approaches for accurate torque production in electric motors and their underlying models have been studied by several researchers [1-14]. It was assumed in these works that the currents applied to the drive circuits (i.e. drive currents) can be controlled accurately and instantaneously, so the currents were treated as the control inputs. Then, the waveforms of the drive currents were pre-shaped so that the generated torque is equal to the requested torque. However, when the drive circuits have current and voltage limits, some of them may not be able to deliver the drive currents dictated by the controller, for example, when the motor operates at high torque or speed, or when a winding fails. Consequently, the motor's torque production may significantly deteriorate as a result of the distortions of the drive current caused by the voltage or current saturation of the amplifiers.

Flux weakening is a known technique that allows a machine to operate above the rated speed in a constant-torque high-speed region, when there is a fixed inverter voltage and current [15]. Below the rated speed, all of the drive currents can be used to produce torque. Above the rated speed, a part of the drive current must be used to oppose the permanent magnet flux while the remaining portion is used to produce torque. Several authors have addressed flux weakening in permanent magnet synchronous motors [16-19]. However, these techniques can deal with electric motors with prefect sinusoidal back-emf waveforms, and current limits are not taken into account.

Accordingly there is a need for a technique for controlling drive circuits of multi-winding brushless motors that improves operation in the event of a failure mode, and for multi-winding brushless motors with improved accuracy of torque output.

SUMMARY OF THE INVENTION

Applicant has conceived of a novel technique for controlling drive circuits of multi-winding brushless motors, using sensors for sensing when the motor is in a failure mode, and, when a winding is found to be in a failure mode at an angular position of the rotor, for distributing a torque to other windings that are not in a failure mode at the same time, so that the torque output is increased at the moment when the winding failed. The failure mode may be an instantaneous failure of the winding. The failure may be complete, in that it results in no torque generation from that winding, or partial, in that some torque is generated by the winding, but not as much as the drive current was expected to generate. Some failure modes are monitored in accordance with the art, having regard to back-emf voltage, whereas others may require additional sensors. In a preferred embodiment of the present invention, one such sensor is an angular velocity sensor, which may be derived from known angular position sensors, or tachometers.

Accordingly, a method is provided for controlling drive currents to respective windings of a multi-winding brushless motor. The method comprises: monitoring an output of the motor and a demand of the motor; determining whether a failure mode has occurred, the failure mode being an instantaneous complete or partial failure to generate demanded output; and, upon detection of a failure mode on a first winding, redistributing a demand contribution that is not being produced by the first winding to one or more of the windings that are not in a failure mode. The output and demand may be torque or angular velocity. The monitoring of the output may be performed with feedback from a closed feedback loop between the drive circuits and a sensor on the motor output. The failure mode may be determined from comparison of demand and output, or from output of a sensor. The failure mode may be a complete failure of a winding, or a partial failure of a winding. There may be a plurality of failure modes that can be detected, and each failure mode may be identified with a different respective redistribution of demand, or method of redistributing the demand. The redistributing of the demand contribution that is not being produced may involve performing a prescribed process to compute difference functions for drive currents applied at each drive circuit.

The method may further comprise a prior, off-line step of computing the prescribed process using a model of the motor.

Also accordingly, a controller is provided for controlling drive currents to respective windings of a multi-winding brushless motor. The controller comprises communications links for receiving a sensed output of the motor and a demand of the motor; communications links for controlling a plurality of drive circuits to excite the drive currents in the respective windings; and a processor adapted to: determine whether a failure mode has occurred, the failure mode being an instantaneous complete or partial failure to generate demanded output; and, upon detection of a failure mode on a first winding, redistributing a demand contribution that is not being produced by the first winding to one or more of the windings that are not in a failure mode.

The sensed output and demand may be either torque or angular velocity. The sensed output may be feedback from a closed feedback loop between the drive circuits and a sensor on the motor output. The communication link for the demand may be coupled to a servomotor. The failure mode may be determined from comparison of demand and output or from output of a sensor. The failure mode may be a complete failure of a winding, or a partial failure of a winding. The failure mode may be one of a plurality of failure modes that can be detected, and the controller may further be adapted to identify a different respective redistribution of demand or a method of redistributing the demand, for each failure mode. The controller may comprise program instructions for executing a prescribed process to compute difference functions for drive currents applied at each drive circuit to redistribute the demand contribution that is not being produced. The prescribed process may involve solving a model of the motor for a set of current conditions.

Also accordingly, a kit is provided, the kit comprising a multiwinding brushless motor and instructions for operating the motor, wherein the instructions rate one of the motor torque and the motor angular velocity above a torque or angular velocity that can be achieved with excitation of drive currents on each winding at saturation.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which:

FIGS. 4a,b,c are plots of back-emf waveform, and cogging torque as a function of angle for an assembled controller, and at table of harmonics characterizing an assembled motor;

FIGS. 5a,b,c are plots of phase offset, gain and virtual torque computed for the assembled motor, providing novel functions for effecting the controller arrangement of FIG. 3;

DESCRIPTION OF PREFERRED EMBODIMENTS

A technique is provided for improving control of demand current to a multiwinding brushless motor, such as a servomotor.

A method in accordance with an embodiment of the present invention involves providing a multiwinding brushless motor with sensors for determining one or more failure modes, and a controller adapted to, upon detection of a failure mode on one winding, redistribute motor demand resulting from the failure mode, to one or more of the windings that are not in a failure mode. This may involve monitoring an output of the motor and a demand of the motor. The output and demand may be torque or velocity output and demand, and may be derived from an operating parameter of a mechanical system incorporating the motor. One example of such a parameter is a degree of extension of a ballscrew or leadscrew driven by the motor, with or without monitoring of a force opposing the ballscrew or leadscrew.

It is conventional for servocontrollers to output demand in terms of velocity and/or torque, and control via downstream parameters requires a high level of integration of the systems, which is practical in some highly engineered systems. More frequently a controller of the motor receives demand signals from a higher level controller, such as a servocontroller, which monitors and generates demand from downstream parameters.

Figure 1:
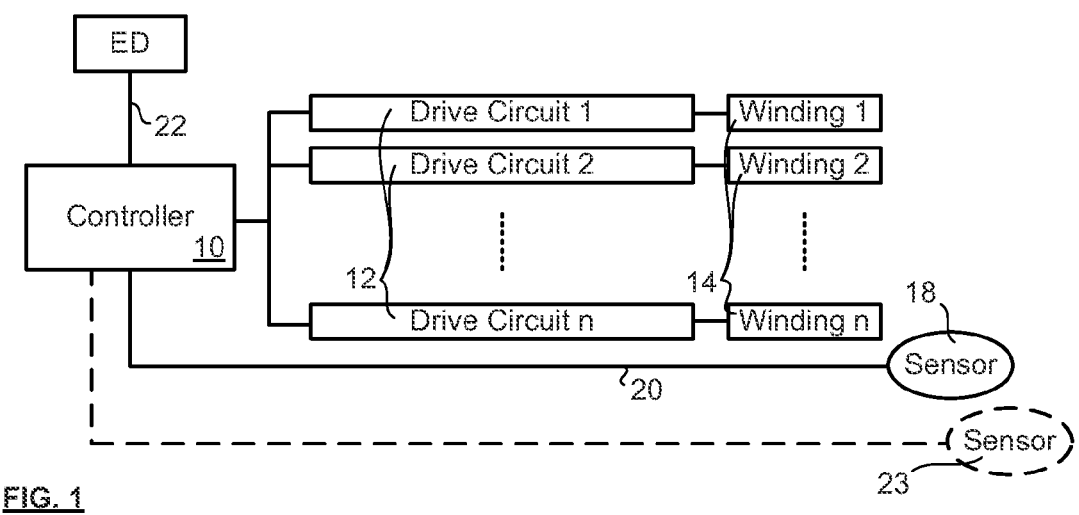
FIG. 1 is a schematic illustration of a controller for a multi-winding brushless motor showing principal components and inputs.

FIG. 1 is a schematic illustration of parts of a multi-winding brushless motor controller 10 coupled to a set of drive circuits 12, each of which being coupled to a respective winding 14. This controller 10 would typically consist of a digital signal processor (DSP), although, for various reasons, it can be an assembly of analog and/or digital components, or may be a part of a computer. The motor has a plurality of windings 14, typically 3 or more, each of which being controlled by a respective drive circuit 12 to generate a magneto-motive force in a manifold (not shown). The controller 10 controls delivery of drive currents 16 from each drive circuit 12 to excite the respective winding 14. The drive currents 16 are timed with a motor output (not in view), which is monitored by a sensor 18, that is communicated to the controller 10 via a link 20. The controller 10 receives a demand over a link 22, which interconnects the controller 10 with an electronic device (ED), which may be of a wide variety of user interfaces, autonomous programs of control equipment, sensors, or the like. In some embodiments, ED is a servocontroller.

The windings 14 may be arrayed on the motor output, a stator of the motor (which is more conventional), and possibly on both, and the magneto-motive force produced by the windings 14 may act on permanent magnets, electromagnets, induction coils, or variable reluctance materials such as soft metals, which may be in the stator or rotor. Today most of the multi-winding brushless motors are of permanent magnet, induction, or variable reluctance types.

The motor may be a rotary motor, with an actuated output in the form of a rotor having a plurality of poles, or it may be a linear motor having a plurality of windings and poles in stator and reciprocating parts. While the layout of the motor windings and poles are different for linear vs. rotary motors, and the output is linearly actuated instead of azimuthally, but the same principles apply mutatis mutandis.

Typically, but not necessarily, the sensor 18 is part of a closed feedback loop between the monitored output (e.g. rotor or reciprocator), with the demand serving to govern the drive circuits. Typically the demand changes more slowly than the sensor feedback loop. Such a closed feedback loop may be analog or digital, and is typically embedded in the drive circuits 12.

To determine whether a demand is not met, output information can be provided by sensor 18, for comparison with the demand. Additionally, or alternatively, one or more sensors 23 may be used to detect particular types of failure modes, which can have respective previously encoded response patterns in the event of detection, and may have a range of response patterns depending on a detected degree or modality. As an example, back-emf is typically monitored in the drive circuits 12, and this can indicate whether a winding has failed, which would typically result in a different redistribution of demand than a voltage or current limit, or some other types of failure modes.

The controller 10 may be programmed to take remedial action in the event of the detected failure mode, in various ways. Generally there is a trade-off between computationally expensive, solutions, with a large volume of monitored information, which give optimized solutions in a widest variety of possible operating conditions, and lower cost solutions that make more assumptions about the operating conditions, have fewer sensors, less data to compile, use a far thinner model of the motor, and a lower cost processor with more heuristic response, that provide lower cost onboard equipment. Some approaches will maximize use of rich off-line models to compute optimal action in the event of a failure given the available sensor information. Either way, the result may be a difference function for drive currents applied at each drive circuit.

EXAMPLE

The example of the present invention is directed to a conventional permanent magnet synchronous rotary motor, in that these were modeled, but it will be appreciated that substantially the same model may be applicable to other motors, and that small variations to control induction or other slip requiring (asynchronous) motors are within the scope of the skilled practitioner. As such, the windings are assumed to be on the stator, and permanent magnetic poles are provided in a rotor.

The failure modes examined are winding fault (complete failure), and saturation of voltage and/or current limits. Other failure modes for which remedial action can be known a priori, may be identified and examined. The demand for the present model is torque demand, and the sensor input includes an angular velocity measure.

The following is a closed-form solution for optimal excitation currents for accurate torque control with waveforms that minimize power dissipation, subject to current and voltage limits. When the drive current exceeds voltage and/or current limits, they are saturated (winding fault can be seen as an extreme case of this), and the controller automatically reshapes the drive currents in the unsaturated windings in such a way that the motor generates torque as demanded, within the limits of the capacity of the other windings.

The optimal management of motor's drive currents can significantly increase the rated speed and torque of the motor in the face of the voltage and current limits. In addition, the torque controller can be used as a remedial strategy to compensate for a phase failure by optimally reshaping the currents of the remaining windings for accurate torque production.

Motor Model with Current and Voltage Limits

The torque produced by windings in such a motor is a function of the drive currents applied and the rotor angle, as well as a cogging torque, which is only a function of the rotor angle. Cogging torque is a well known property of motors that results from stator features, and it is generally desired to correct for this effect. If the motor operates in a linear magnetic regime, then the torque $\tau$ of the motor with p windings is given by EQ1:

$$\tau(\theta, i) = \phi^T(\theta) i \alpha \tau_{cog}(\theta) \tag{1}$$

where $\tau_{cog}$ is the cogging torque, $\theta$ is the angular position of the rotor, and vectors $\phi \in R^p$ and $i \in R^p$ are defined as:

$$\phi(\theta) = [\phi_1(\theta), \ldots, \phi_p(\theta)]^T \ i = [i_1, \ldots, i_p]^T \tag{2}$$

Here, $i_k$ and $\phi_k(\theta)$ are the drive current and back-emf shape function of the k th winding. In typical rotary electric motors, the shape functions are periodic functions of rotor angle. Since successive windings are shifted by $2\pi/p$, the k th torque shape function can be constructed as EQ2:

$$\phi_k(\theta) = \phi\left(q\theta + \frac{2\pi(k-1)}{p}\right), \tag{3}$$

where q is the number of motor poles. Furthermore, since $\phi$ is a periodic function with spatial frequency $2\pi/q$, it can be effectively approximated through the truncated complex Fourier series as EQ3

$$\phi(\theta) = \sum_{n=-N}^{N} c_n e^{jnq\theta}$$

where $j = \sqrt{-1}$, $\{c_1, \ldots, c_N\}$ are the Fourier coefficients, and N can be chosen arbitrary large. Similarly, the cogging torque can be approximated by another finite Fourier series as EQ4

$$\tau_{cog}(\theta) = \sum_{n=-N}^{N} b_n e^{jnq\theta}, \tag{4}$$

where $\{b_1, \ldots, b_N\}$ are the corresponding Fourier coefficients.

Thus the torque control problem is: Given a desired motor torque $\tau_d$, solve EQ1 for the drive currents, i. Given a scalar torque set point, EQ1 permits infinitely many drive current waveforms. Since the continuous mechanical power output of electrical motors is limited primarily by heat generated from internal copper losses, we use the freedom in the drive current solutions to minimize power losses, $$P_{loss} = R\|i\|^2, \tag{5}$$

where R is the resistance of the windings. However, due to voltage and current limits of the drive circuits, minimization of EQ5 must be subject to the following set of 2p inequality constraints (EQ6a,b):

$$|i_k| \le i_{max} \quad |v_k| \le v_{max} \quad \forall k=1,\ldots,p. \tag{6}$$

where $v_k$ is the voltage of the k th drive circuit, and $i_{max}$ and $v_{max}$ are, respectively, the current and voltage limits of the motor's drivers. In the following development, we will show that the above set of 2p inequalities can be equivalently reduced to a set of p inequalities if the motor inductance is assumed negligible.

The voltage of the winding terminal of an electric motor is the superposition of the back-emf and the ohmic voltage drop if the inductance of the stator coils is negligible [20-22]. That is EQ7:

$$v_k = Ri_k + e_k \quad k=1,\ldots,p \tag{7}$$

where $e_k$ is the back-emf of the k th winding, which is equal to the rotor speed, $\omega$, times the back-emf shape functions, $\phi_k(\theta)$, i.e., $$e_k = \phi_k(\theta)\omega.$$

Using the relation between the terminal voltages and the drive currents in EQ7, we can rewrite inequalities EQ6b as EQ8:

$$\left| i_k + \frac{\omega}{R}\phi_k(\theta) \right| - \frac{v_{max}}{R} \le 0 \tag{8}$$
$$\forall k = 1, \ldots, p$$

which are equivalent to EQ9:

$$\frac{-v_{max} - \omega\phi_k(\theta)}{R} \le i_k \le \frac{v_{max} - \omega\phi_k(\theta)}{R} \tag{9}$$
$$k = 1, \ldots, p$$

Using EQ6a in EQ9 yields:

$$\frac{-v_{max} - \omega\phi_k(\theta)}{R} > -i_{max}$$
$$\frac{v_{max} - \omega\phi_k(\theta)}{R} < i_{max}$$
$$\forall \theta \in R, k = 1, \ldots, p$$

Therefore, the condition for the existence of a solution for inequalities EQ6a and EQ9 can be expressed by EQ10:

$$\max_{\theta,k} |\phi_k(\theta)| < \frac{v_{max} + Ri_{max}}{\omega} \tag{10}$$

In other words, if condition EQ10 is satisfied, then inequalities EQ6a and EQ9 can be combined in the following form EQ11:

$$\underline{i}_k \le i_k \le \overline{i}_k \tag{11}$$

where the lower- and upper-bound current limits are EQ12:

$$\underline{i}_k(\theta, \omega) = \max\left(-i_{max}, \frac{-v_{max} - \omega\phi_k(\theta)}{R}\right) \tag{12}$$

$$\overline{i}_k(\theta, \omega) = \min\left(i_{max}, \frac{v_{max} - \omega\phi_k(\theta)}{R}\right)$$

Finally, the constraint inequality on the drive currents pertaining to both current and voltage limitations can be expressed by EQ13:

$$|i_k - \rho_k(\theta,\omega)| - \sigma_k(\theta,\omega) \le 0 \quad \forall k=1,\ldots,p \tag{13}$$

where $$\rho_k(\theta,\omega) = \tfrac{1}{2}(\overline{i}_k + \underline{i}_k) \quad \sigma_k(\theta,\omega) = \tfrac{1}{2}(\overline{i}_k - \underline{i}_k) \tag{14}$$

are the current offset and gain associated with the k th winding. The inequality constraints EQ13 imposed on the drive currents are equivalent to both voltage and current limits of EQ6a,b. Notice that parameters $\rho_k$ and $\sigma_k$ are not constants, rather they are at given mechanical states $\theta$ and $\omega$. Nonetheless, in the following analysis, we drop the position and velocity arguments for the simplicity of notation.

Optimal Reshaping of Drive Currents: Quadratic Programming

With this model, optimal reshaping of the phase currents can be performed with quadratic programming. The derivations in this section present the optimal drive currents $$i^* = [i^*_1, \ldots, i^*_p]^T,$$

which generate the demand torque $\tau_d$ and minimize the power losses per EQ5, subject to the constraints of EQ6a,b. By setting $\tau = \tau_d$ in EQ1, and using the inequality constraints of EQ13, the problem of finding optimal instantaneous currents can be equivalently formulated as the following quadratic programming problem EQ15a,b,c:

$$\min i^T i \tag{15}$$
$$\text{subject to: } h = \varphi^T i + \tau_{cog} - \tau_d = 0$$
$$g_i = \frac{|i_1 - \rho_1|}{\sigma_1} - 1 \le 0$$
$$\vdots$$
$$g_p = \frac{|i_p - \rho_p|}{\sigma_p} - 1 \le 0$$

Note that all the instantaneous variables in the above equality and inequality constants, i.e., $\phi_k$, $\rho_k$, and $\sigma_k$, are at given rotor angular position, $\theta$, and velocity $\omega$. Since all the functions are convex, any local minimum is a global minimum as well. Now, we seek the minimum point $i^*$ satisfying the equality and inequality constraints. Before we pay attention to the general solution, it is beneficial to exclude the trivial solution, $i^*_k = 0$. If the k th torque shape function is zero, that winding contributes no torque regardless of its current. Hence EQ16, $$\phi_k = 0 \Rightarrow i^*_k = 0 \quad \forall k=1,\ldots,p \tag{16}$$

immediately specifies the optimal drive currents at the crossing point. By excluding the trivial solution, we deal with a smaller set of variables and number of equations in our optimization programming. Therefore, we have to find the optimal solution corresponding to the nonzero part. Hereafter, without loss of generality, we assume that all torque shape functions are non-zero.

Now, defining the function (EQ17)

$$L = f + \lambda h + \mu^T g, \quad (17)$$

where $f = i^T i$, $g = [g_1, g_2, \ldots, g_p]^T$, $\lambda \in R$, and $\mu = [\mu_1, \mu_2, \ldots, \mu_p]^T$. Let $i^*$ provide a local minimum of $f(i)$ satisfying the equality and inequality constraints 15b and 15c. Assume that column vectors $\nabla_i g|_{i=i^*}$ are linearly independent. Then according to the Kuhn-Tucker theorem [23], there exist $\mu_k \geq 0 \forall k=1, \ldots, p$ such that EQ18

$$\nabla_i L = 0 \; \mu_k g_k(i^*_k) = 0 \; \forall k=1, \ldots, p. \quad (18)$$

Denoting sgn(•) as the sign function, we can show that $$\nabla_i g = \text{diag}\left\{\frac{\text{sgn}(i_1 - \rho_i)}{\sigma_i}, \ldots, \frac{\text{sgn}(i_p - \rho_p)}{\sigma_p}\right\},$$

in which the columns are linearly independent. The only pitfall is $i_k = 0$, where the sign function is indefinite. We assume that the optimal solutions $i^*_k$ are non-zero because $\phi_k \neq 0$. This assumption will be relaxed later. Substituting $f$, $h$ and $g$ from EQ15 into EQ18 yields EQ19a,b:

$$2\sigma_k i^*_k + \lambda \sigma_k \phi_k + \mu_k \, \text{sgn}(i^*_k - \rho_k) = 0 \; \mu_k(|i^*_k - \rho_k| - \sigma_k) = 0 \quad (19)$$

EQ19a, EQ19b, and EQ15b together constitute a set of 2p+1 nonlinear equations with 2p+1 unknowns $i^*$, $\lambda$, and $\mu$ to be solved in the following way. Since $\mu_k g_k(i^*_k) = 0$ while $\mu_k \geq 0$ and $g_k(i^*_k) \leq 0$, we can say that $\mu_k = 0$ if $|i_k - \rho_k| < \sigma_k$, while $\mu_k > 0$ if $|i_k - \rho_k| = \sigma_k$. Therefore, EQ19a can be written in the following compact form EQ20:

$$T_k(i^*_k - \rho_k) = -\tfrac{1}{2}\lambda \phi_k - \rho_k \; \forall k=1, \ldots, p. \quad (20)$$

The mapping $T_k: D_k \mapsto R$, in which $$D_k(x) = \{x \in R : |x - \rho_k| \leq \sigma_k\},$$

is defined by EQ21:

$$T_k(x) = \begin{cases} x & |x - \rho_k| < \sigma_k \\ x + \dfrac{\mu_k}{2\sigma_k} \text{sgn}(x - \rho_k) & |x - \rho_k| = \sigma_k \end{cases} \quad (21)$$

It is apparent that the mapping is invertible on D, i.e. there exists a function $T^{-1}(x)$ such that $T_k^{-1}(T_k(x)) = x \; \forall x \in D$. In other words, the variable $i^*_k$ in EQ20 can be determined uniquely if the right-hand-side of the equation is given. The inverse of the mapping is the saturation function, i.e. $T_k^{-1}(\bullet) \equiv \sigma_k \, \text{sat}(\bullet/\sigma_k)$ where EQ22:

$$sat(x) = \begin{cases} 1 & x > 1 \\ x & -1 \leq x \leq 1 \\ -1 & x < -1 \end{cases} \quad (22)$$

In view of the function definition, we can rewrite EQ20 as EQ23:

$$i^*_k = \rho_k + \sigma_k \, sat\left(\frac{-0.5 \lambda \phi_k - \rho_k}{\sigma_k}\right) \quad (23)$$

$$\forall k = 1, \ldots, p.$$

Upon substitution of the optimal drive currents from EQ23 into the torque equation EQ15b, we arrive at EQ24:

$$\sum_{k=1}^{p} \phi_k \sigma_k \, sat\left(\frac{-0.5 \lambda \phi_k - \rho_k}{\sigma_k}\right) = \tau^*, \quad (24)$$

where $$\tau^* = \tau_d - \tau_{cog} - \tau_\rho, \text{ and EQ 25:}$$

$$\tau_\rho = \sum_{j=1}^{p} \phi_j \rho_j \quad (25)$$

is the torque offset calculated at any position θ. Note that $\tau_\rho$ does not have any physical meaning but can be interpreted as the torque associated with non-zero mean values of the current limits. Since λ is the only unknown variable in EQ24, finding the optimal values of the drive currents boils down to solve the algebraic equation EQ24 for the Lagrangian multiplier. Apparently, the left-hand side of EQ24 is a piecewise linear function of λ. Thus, EQ24 can be concisely written as EQ26

$$\psi(\lambda) = \tau^*. \quad (26)$$

Figure 2:
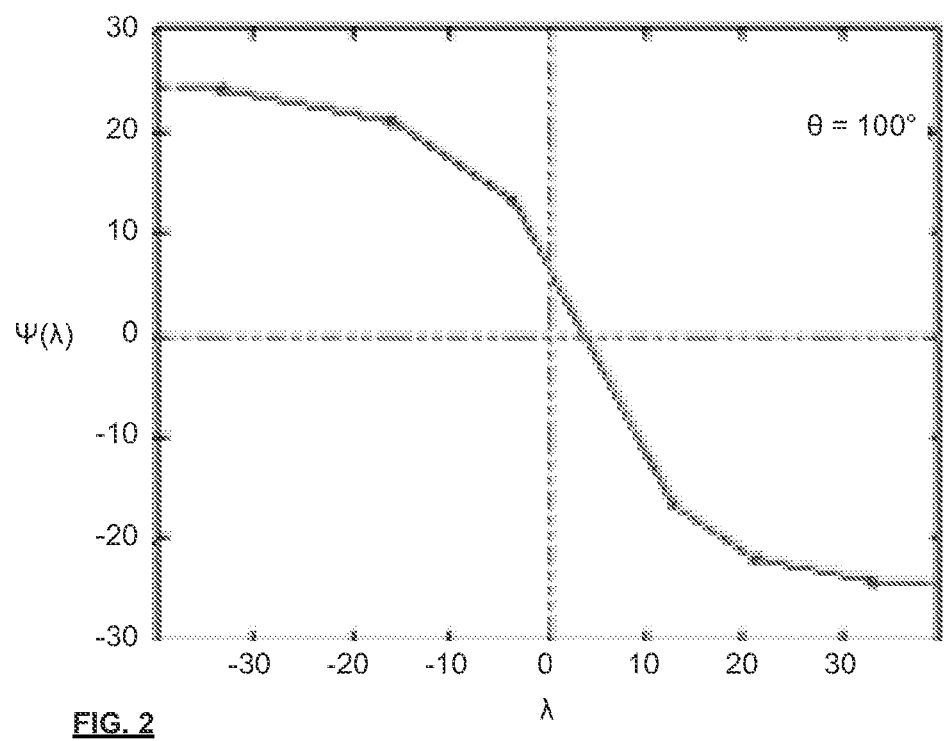
FIG. 2 is a piecewise linear function of a Lagrangian multiplier, which is a general form of an optimal solution to control in the event of current or voltage saturation.

As an illustration, the piecewise linear function for a motor system which will be described below is depicted in FIG. 2 for a particular motor angle of 100°. The slope of the piecewise linear function abruptly decreases each time one of the phases saturates and when all phases saturate the slope becomes zero, in that case there is no solution for λ. Therefore, the piecewise linear function is invertible only if the following conditions are satisfied EQ27:

$$\psi_{min} + \tau_{cog} - \tau_\rho \leq \tau_d \leq \psi_{max} + \tau_{cog} - \tau_\rho \quad (27)$$

Then, the corresponding Lagrangian multiplier can be obtained by EQ28:

$$\lambda = \psi^{-1}(\tau^*) \quad (28)$$

Finally, substitution of EQ28 into EQ23 yields the optimal drive currents as EQ29:

$$i^*_k = \rho_k + \sigma_k \, sat\left(\frac{-0.5 \psi^{-1}(\tau^*) \phi_k - \rho_k}{\sigma_k}\right). \quad (29)$$

Figure 3:
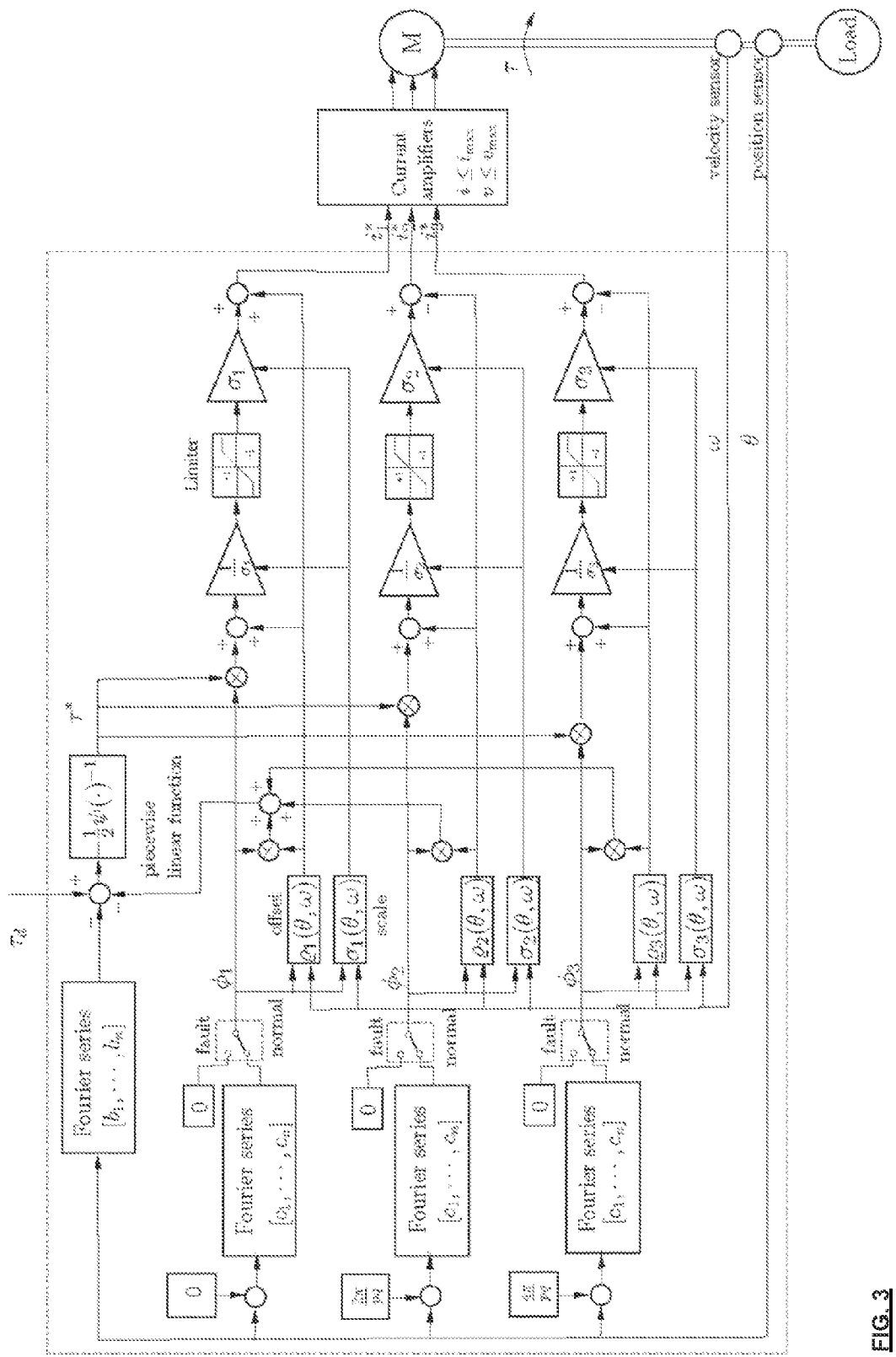
FIG. 3 is a schematic illustration of a controller arrangement in accordance with the example.

The motor, amplifier drives, and the torque controller are schematically illustrated in FIG. 3. In FIG. 3 illustrates a control system for a rotary brushless mother having 3 windings. In operation, in the event that no winding is saturated or failed, each winding's switch will be in the normal setting, as shown. Furthermore all of the phase offsets $\rho_k = 0$, and scaling factors $\sigma_k = 1$ in this state. Null signals will be sent from the 3 windings, and added, and as a result the cogging torque will be subtracted from the demand torque, and forwarded to the piecewise linear function, which will not affect the torque function. As a result, the torque will be fed to the circuits, which divide and then multiply by $\sigma_k$, and apply the limiting function will have unitary effect. A null phase offset is applied, and then the excitation is applied at the winding.

If a winding is in a voltage or current saturation state, the limiter in the drive circuit will preclude oversupply of current or voltage. Given angular position θ, the shape functions $\phi_k$, are derived form corresponding Fourier coefficients, according to EQ2, and EQ3. This is performed by the signal processors called Fourier series $[c_1 \ldots c_n]$. Similarly, with corresponding Fourier coefficients, cogging torque $\tau_{cog}$ is derived from angular position θ at the signal processor defined with coefficients $b_1 \ldots b_n$. Given angular velocity ω, and $\phi_k$, signal processors in each drive circuit compute $\sigma_k$, and $\rho_k$, according to EQ12, and EQ14. The $\rho_k$ and $\phi_k$ are multiplied and summed over the 3 windings to computer $\tau_\rho$ as per EQ25. Then using the cogging torque, demand torque, and $\tau_\rho$, EQ26 is computed by summing. The Lagrangian multiplier is obtained by application of the piecewise linear function to lambda and the resulting current of EQ29 is multiplied by $\phi_k$, subject to limiting, the gain and phase shift are applied and the resulting signal is amplified and used to excite the windings. Specifically, the characterized phase offset and scale factors are sent to the gains in the circuit before and after the limiter, and the phase offsets are applied before and after the scaling.

If a winding failure is determined, from the position sensor feedback, which is decomposed for each winding's phase, the switch will be tripped for the corresponding drive circuit, which will send a null $\phi_k$ on winding's drive circuit. When an open-circuit or short-circuit fault occurs, the faulty winding is isolated and the currents of the remaining healthy windings are optimally reshaped for accurate torque production. It is clear from EQ16 that when the instantaneous back-emf of a winding takes a zero value, the corresponding drive current becomes trivially zero. Therefore, the faulty winding can be easily isolated by setting the value of its back-emk shape function to zero in the optimization formulation. Now, suppose that the motor's shape functions for the optimization programming EQ15 is modified according to EQ30:

$$\phi_k = \begin{cases} \phi_k & \text{for normal phase} \\ 0 & \text{for faulty phase} \end{cases} \quad (30)$$

Then, the optimal solution EQ29 ensures that the instantaneous currents of faulty winding is zero, while the remaining windings generate the desired torque satisfying the optimality conditions.

Experiment

In order to evaluate the performance of the optimal torque controller, experiments were conducted on a three-phase synchronous motor with 9 pole pairs. Three independent current servo amplifiers (Advanced Motion Control 30A20AC) control the motor's excitation currents as specified by the torque controller. The electric motor and a hydraulic rack and pinion rotary motor are mounted on the rigid structure of a dynamometer. The hydraulic motor's shaft is connected to that of the electric motor via a torque transducer (Himmelstein MCRT 2804TC) by means of two couplings which relieve bending moments or shear forces due to small axes misalignments. The speed of the hydraulic motor is controlled by a pressure compensated flow control valve. The hydraulic pressure is set sufficiently high so that the hydraulic actuator can always regulate the angular speed regardless of the electric motor torque. In other words, the operating speed of the electric motor is independently set by the hydraulic actuator. The winding voltages are attenuated by resistor branches and then sensed by Isolation Amplifiers (model AD 210 from Analog Device). The Isolation Amplifier System eliminates the possibility of leakage paths and ground loops between the power servo amplifiers and the data acquisition system by providing complete transformer isolation. A multi-channel data acquisition system acquires the analog data at the sampling rate of 1 kHz. Errors between the measured rotor position, used by the torque controller for current commutation, and the true rotor position will result in torque ripple. One source of this error is measured quantization. In order to minimize the torque-ripple induced by this quantization as much as possible, the motor uses a high-resolution encoder with 0.001° resolution for measurement of angular position.

Identification of Motor Parameters

Torque shape functions are measured by using the hydraulic dynamometer [24]. To this end, the torque trajectory data versus position was registered during the rotation, while one winding was energized with a constant current. The value of the winding resistance measured by a wheat-stone bridge instrument is EQ31:

$$R = 2.54\Omega.$$

The torque-angle data are registered within almost one rotation while the drive current is kept constant. But the current is incremented at the end of each rotation stroke by 1 Amp until an ensemble of torque profiles belonging to the span of [−15, 15] Amp is obtained. By taking the average of two sequences of the motor torques corresponding to when the motor shaft is rotated clockwise and counter-clockwise, the effect of the bearing friction torque in the motor torque measurement is compensated. Now at every motor position $\theta$, the current load cases $i_1^j$ s and the corresponding measured torques $\tau^j(\theta)$ are related by EQ32:

$$\begin{bmatrix} i_1^1 & 1 \\ i_1^2 & 1 \\ \vdots & \vdots \\ i_1^u & 1 \end{bmatrix} \begin{bmatrix} \phi_1(\theta) \\ \tau_{cog}(\theta) \end{bmatrix} = \begin{bmatrix} \tau^1(\theta) \\ \tau^2(\theta) \\ \vdots \\ \tau^u(\theta) \end{bmatrix} \quad (32)$$

Then, $\phi_1(\theta)$ and $\tau_{cog}(\theta)$ can be obtained at every given position by using the pseudo-inverse of the above matrix equation.

Since the motor has nine pole pairs, the torque trajectory is periodic in position with a fundamental spatial-frequency of 9 cpr (cycles/revolution) and thus the torque pattern repeats every 40 degrees. The Fourier coefficients can by calculated by the inverse fourier series $$c_n = \sum_{\theta=\theta_o}^{\theta_o + \frac{2\pi}{q}} \phi_1(\theta) e^{-jnq\theta}$$

$$b_m = \sum_{\theta=\theta_o}^{\theta_o + \frac{2\pi}{q}} \tau_{cog}(\theta) e^{-jmq\theta}$$

The phase shape functions, $\phi_k$, and the cogging torque are shown in FIGS. 4a,b and the corresponding Fourier coefficients are given in FIG. 4c (Table 1). These are basic properties of the assembled motor, and the corresponding parameters are determined to a high degree of accuracy with this method.

Performance Test

The proposed torque controller subject to current and voltage limits has been implemented on the three-phase motor. An emulator of the control system of FIG. 3 was created in software to control the motor. The objective of this section is to demonstrate that the torque controller can deliver accurate torque production in the face of current and voltage saturation. It has been shown [2] that non-constrained optimization of motor torque leads to the following solution of drive currents EQ33:

$$i_k(\theta) = \frac{\phi_k(\theta)}{\|\varphi(\theta)\|^2}(\tau_d - \tau_{cog}). \quad (33)$$

For a comparative result, the performances of both constrained torque controller EQ29 and non-constrained torque controller EQ33 are presented. It is worth noting that, in the case of non-constrained optimization torque controller, the maximum torque is reached as soon as one winding saturates. On the other hand, the constrained optimization algorithm increases the torque contribution of the unsaturated windings when one winding saturates, until, in the limit, all windings are saturated.

The motor shaft is rotated by the hydraulic actuator at a constant speed while the motor torque is monitored by the torque transducer. The maximum winding voltage and current are specified as EQ34:

$$i_{max}=10 \text{ Amp } v_{max}=40 \text{ Volt} \quad (34)$$

In the first part of the experiment, the desired torque and the rotation speed of the hydraulic motor are set to EQ35:

$$\text{Case I: } \begin{cases} \tau_d = 10 \text{ Nm} \\ \omega = 21 \text{ rad/s} \end{cases} \quad (35)$$

Figure 6C:
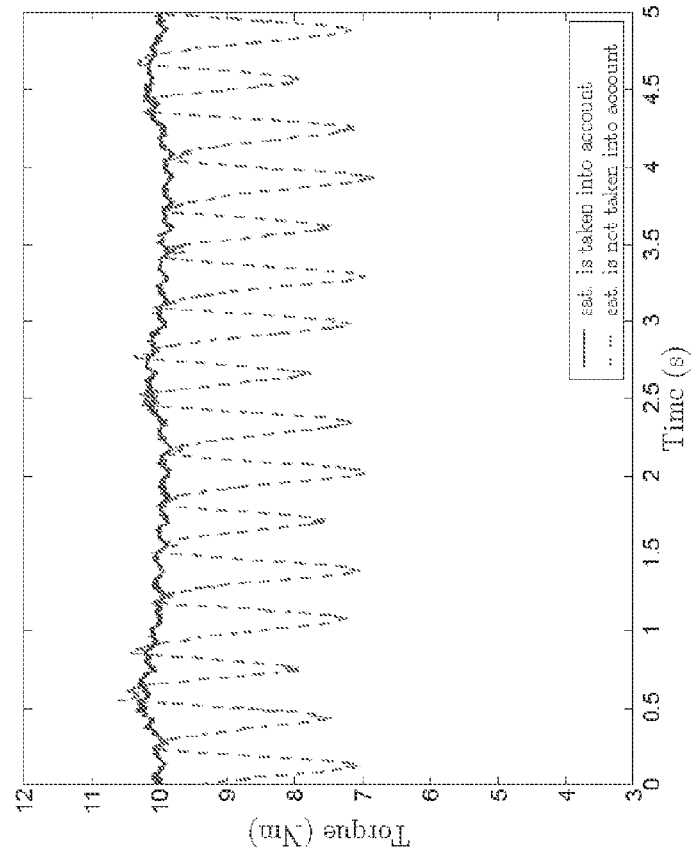
FIGS. 6a,b,c are plots of drive currents, terminal voltage, and torque output offset of the assembled control system, the latter having a constrained and non-constrained plots for comparison, in the condition of a voltage saturation.
Figure 6A:
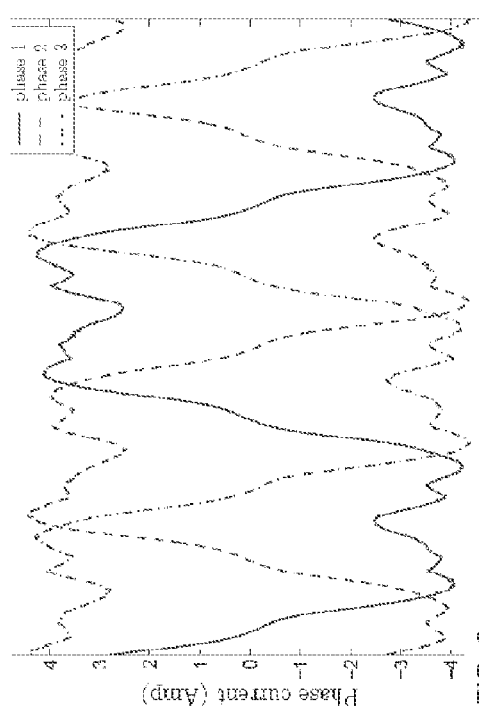
Figure 6B:
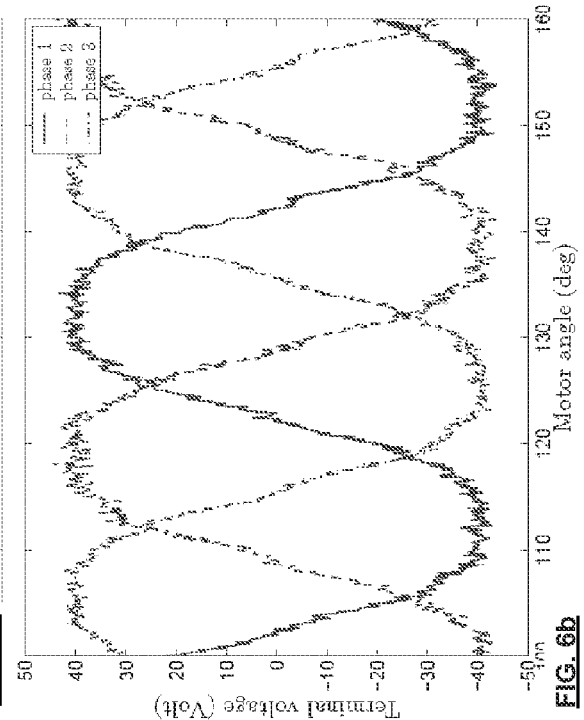

FIG. 5a is a graph showing the phase offsets applied during voltage or current saturation. FIG. 5b is a graph showing the scaling factor applied during voltage or current saturation. FIG. 5c is a graph of the $\tau_\rho$ applied during the voltage or current saturation. FIGS. 6a and 6b plot the winding current waveform and the time-history of the consequent terminal voltages, respectively. It is clear from the latter figure that the winding voltages reach their limits in this experiment, but the drive currents are far from the current limit. The motor torque is shown in FIG. 6c, which shows that in comparison with the known saturation-uncompensated technique, substantial torque ripple is avoided using the same physical motor, with only a change in the control design.

At low velocity and high desired torque, it is most likely that the windings current saturation occur rather than the winding voltage saturation. As a demonstration, in the second part of the experiment the desired torque and the shaft speed are set to EQ36

$$\text{Case II: } \begin{cases} \tau_d = 25 \text{ Nm} \\ \omega = 2 \text{ rad/s} \end{cases} \quad (36)$$

Figure 7A:
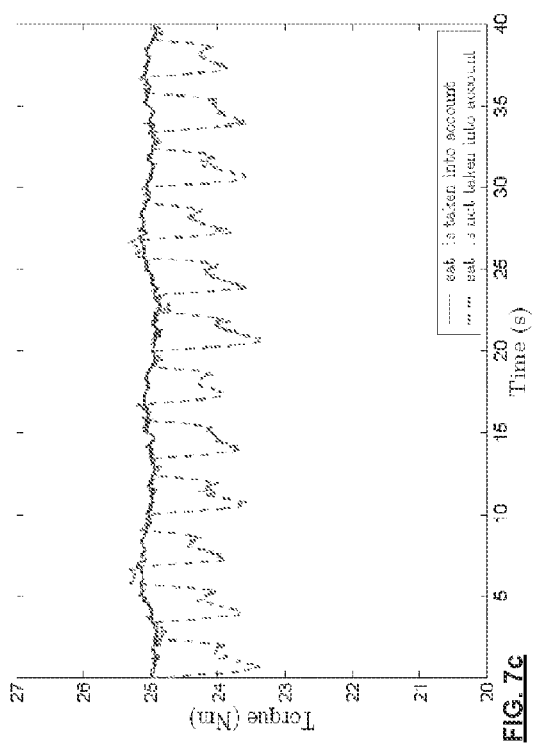
FIGS. 7a,b,c are plots of drive currents, terminal voltage, and torque output offset of the assembled control system, the latter having a constrained and non-constrained plots for comparison, in the condition of a current saturation.
Figure 7B:
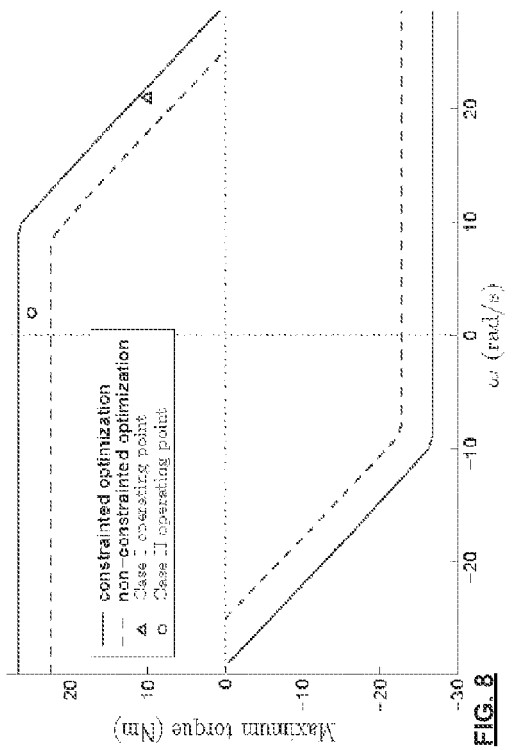
Figure 7C:
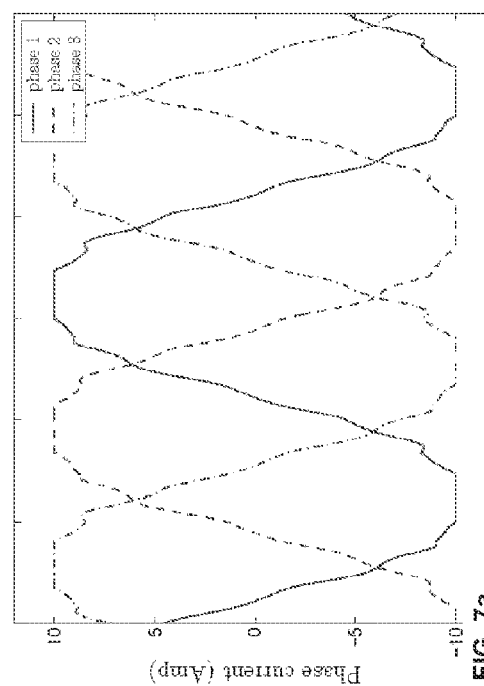

It is apparent from the values of drive currents and voltages in FIGS. 7a and 7b that the drive currents reach their limit while the terminal voltages are not saturated. FIG. 7c shows that again saturation-compensated control has substantial advantages in providing accurate torque output over the prior art.

Motor Torque-Velocity Characteristic

Figure 8:
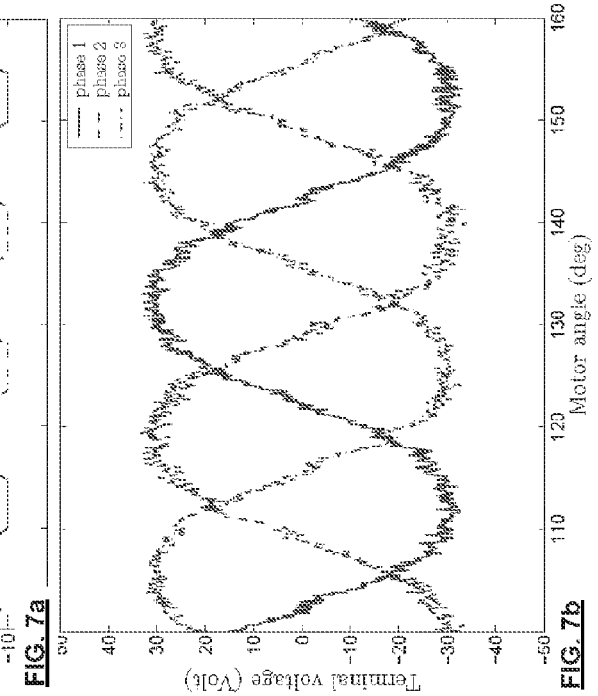
FIG. 8 is a plot of operational ranges of the assembled motor with and without the constrained optimization showing extended range in accordance with the present invention.

The control algorithm presented in previous section permits torque sharing among windings when some windings saturate. This results in a considerable increase in the attainable maximum motor torque because the torque controller automatically increases the torque contribution of the unsaturated windings when one winding saturates. This is clearly demonstrated in FIG. 8 which depicts the maximum attainable motor torques corresponding to the solutions of the saturation-compensated and saturation non-constrained control. The graphs indicate that the maximum torque capability is improved by 20% when the winding saturation is considered in the drive current shape function.

Single-Winding Failure

The optimal torque controller can produce accurate torque even under operation of a single winding failure. In this experiment, the current circuit of the motor's first winding is virtually broken by sending zero signal to the enable port of the corresponding power amplifier. Thus EQ37:

$$\phi_1(\theta) \equiv 0 \; \forall \theta \in R \quad (37)$$

The objective is to produce the same torque 10 Nm as the three windings by using only the remaining two windings, i.e., EQ38:

$$\text{Case III: } \begin{cases} \tau_d = 10 \text{ Nm} \\ \omega = 21 \text{ rad/s} \\ \phi_1 \equiv 0 \text{ (open - circuit)} \end{cases} \quad (38)$$

Figure 9C:
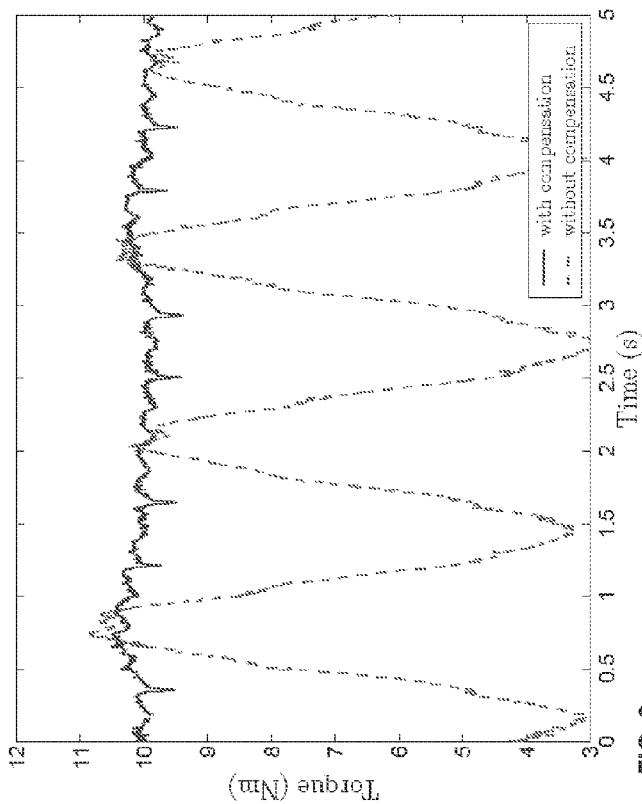
FIGS. 9a,b,c are plots of drive currents, terminal voltage, and torque output offset of the assembled control system, the latter having a constrained and non-constrained plots for comparison, in the condition of a current saturation.
Figure 9A:
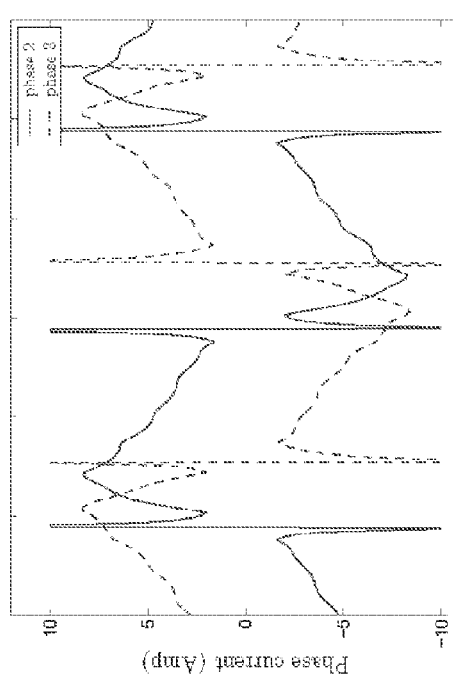
Figure 9B:
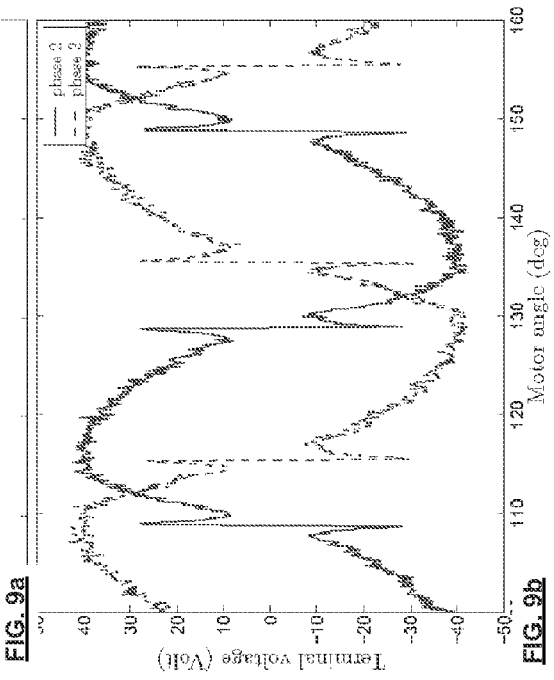

The currents and voltages of the two healthy windings are shown in FIGS. 9a and 9b. FIG. 9c depicts motor torques when one winding is open circuit. The dashed line in FIG. 9c shows motor torque produced by a controller assuming all three windings are normal. This results in drastic torque fluctuation because the healthy windings do not compensate for lacking torque of the faulty winding. The solid line in FIG. 9c shows that the motor still producing the constant desired torque when the torque controller is designed based on the two healthy windings.

Thus the saturation compensated control has been demonstrated and proves advantageous over saturation non-compensated control.

References: The contents of the entirety of each of which are incorporated by this reference:

S. J. Park, H. W. Park, M. H. Lee, and F. Harashima, "A new approach for minimum-torque-ripple maximum-efficiency control of BLDC motor," IEEE Trans. on Industrial Electronics, vol. 47, no. 1, pp. 109-114, February 2000.

F. Aghili, M. Buehler, and J. M. Hollerbach, "Experimental characterization and quadratic programming-based control of brushless-motors," IEEE Trans. on Control Systems Technology, vol. 11, no. 1, pp. 139-146, 2003.

Y. Murai, Y. Kawase, K. Ohashi, K. Nagatake, and K. Okuyama, "Torque ripple improvement for brushless dc miniature motors," Industry Applications, IEEE Transactions on, vol. 25, no. 3, pp. 441-450, May/June 1989.

N. Matsui, T. Makino, and H. Satoh, "Autocompensation of torque ripple of direct drive motor by torque observer," IEEE Trans. on Industry Application, vol. 29, no. 1, pp. 187-194, January-February 1993.

D. G. Taylor, "Nonlinear control of electric machines: An overview," IEEE Control Systems Magazine, vol. 14, no. 6, pp. 41-51, 1994.

C. French and P. Acarnley, "Direct torque control of permanent magnet drives," IEEE Trans. on Industry Applications, vol. 32, no. 5, pp. 1080-1088, September-October 1996.

J.-K. Kang and S.-K. Sul, "New direct torque control of induction motor for minimum torque ripple and constant switching frequency," IEEE Trans. on Industry Applications, vol. 35, no. 5, pp. 1076-1082, September-October 1999.

Y. Wang, D. Cheng, C. Li, and Y. Ge, "Dissipative Hamiltonian realization and energy-based L2-disturbance attenuation control of multimachine power systems," IEEE Trans. on Automatic Control, vol. 48, no. 8, pp. 1428-1433, August 2003.

Z. Xu and M. F. Rahman, "A variable structure torque and flux controller for a DTC IPM synchronous motor drive," in IEEE 35th Annual Power Electronics Specialists Conference, PESC 04., June 2004, pp. 445-450, Vol. 1.

S. Ozturk and H. Toliyat, "Direct torque and indirect flux control of brushless dc motor," Mechatronics, IEEE/ASME Transactions on, vol. 16, no. 2, pp. 351-360, April 2011.

H. Grabner, W. Amrhein, S. Silber, and W. Gruber, "Nonlinear feedback control of a bearingless brushless dc motor," Mechatronics, IEEE/ASME Transactions on, vol. 15, no. 1, pp. 40-47, February 2010.

C.-W. Tsai, C.-L. Lin, and C.-H. Huang, "Microbrushless dc motor control design based on real-coded structural genetic algorithm," Mechatronics, IEEE/ASME Transactions on, vol. 16, no. 1, pp. 151-159, February 2011.

F. Aghili, "Fault-tolerant torque control of BLDC motors," Power Electronics, IEEE Transactions on, vol. 26, no. 2, pp. 355-363, 2011.

- - - , "Optimal joint torque control subject to voltage and current limits of motor drivers," in Proc. of IEEE/RSJ International Conference on Intelligent Robots and Systems (IROS), San Francisco, Calif., September 2011, pp. 3784-3791.

A. EL-Refaie, D. Novotny, and T. Jahns, "A simple model for flux weakening in surface pm synchronous machines using back-to-back thyristors," Power Electronics Letters, IEEE, vol. 2, no. 2, pp. 54-57, June 2004.

T. Sebastiangordon and G. R. Slemon, "Operating limits of inverter-driven permanent magnet motor drives," Industry Applications, IEEE Transactions on, vol. IA-23, no. 2, pp. 327-333, 1987.

T. M. Jahns, "Flux-weakening regime operation of an interior permanent-magnet synchronous motor drive," Industry Applications, IEEE Transactions on, vol. IA-23, no. 4, pp. 681-689, 1987.

B. Sneyers, D. W. Novotny, and T. A. Lipo, "Field weakening in buried permanent magnet ac motor drives," Industry Applications, IEEE Transactions on, vol. IA-21, no. 2, pp. 398-407, 1985.

R. Schiferl and T. A. Lipo, "Power capability of salient pole permanent magnet synchronous motors in variable speed drive applications," Industry Applications, IEEE Transactions on, vol. 26, no. 1, pp. 115-123, 1990.

J. R. Hendershot and T. J. E. Miller, Design of Brushless Permanent-Magnet Motors. 1 em plus 0.5 em minus 0.4 em Oxford, U.K.: Magna Physics and Clarendon, 1994.

O. Moseler and R. Isermann, "Application of model-based fault detection to a brushless dc motor," Industrial Electronics, IEEE Transactions on, vol. 47, no. 5, pp. 1015-1020, October 2000.

J.-H. Lee, D.-H. Kim, and I.-H. Park, "Minimization of higher back-emf harmonics in permanent magnet motor using shape design sensitivity with b-spline parameterization," Magnetics, IEEE Transactions on, vol. 39, no. 3, pp. 1269-1272, May 2003.

H. W. Kuhn and A. W. Tucker, "Nonlinear programming," in Proc. Second Berkeley Symposium on Mathematical Statistics and Probability, Berkeley: University of California Press, 1951, pp. 481-492.

F. Aghili, J. M. Hollerbach, and M. Buehler, "A modular and high-precision motion control system with an integrated motor," IEEE/ASME Trans. on Mechatronics, vol. 12, no. 3, pp. 317-329, June 2007.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A method for controlling drive currents to respective windings of a multi-winding brushless motor, the method comprising:
    monitoring an output of the motor and a demand of the motor;
    determining whether a failure mode has occurred, the failure mode being an instantaneous failure to generate demand, the failure mode being one of: a complete failure of a winding, a voltage saturation, and a current saturation; and,
    upon detection of a failure mode on a first winding, reshaping the drive currents to the respective windings, to redistribute a demand contribution that is not being produced by the first winding to one or more of the windings that are not in a failure mode.

2. The method of claim 1 wherein the output and demand are either torque or angular velocity.

3. The method of claim 1 wherein monitoring the output is performed with feedback from a closed feedback loop between the drive circuits and a sensor on the motor output.

4. The method of claim 1 wherein the failure mode is determined from comparison of demand and output.

5. The method of claim 1 wherein the failure mode is determined from output of a sensor.

6. The method of claim 1 wherein the failure mode is one of a plurality of failure modes that can be detected, and each failure mode is identified with a different respective redistribution of demand.

7. The method of claim 1 wherein redistributing the demand contribution that is not being produced comprises performing a prescribed process to compute difference functions for drive currents applied at each drive circuit.

8. The method of claim 7 further comprising a prior, off-line step of computing the prescribed process using a model of the motor.

9. A controller for controlling drive currents to respective windings of a multi-winding brushless motor, the controller comprising:
    communications links for receiving a sensed output of the motor and a demand of the motor, the communication link for the demand coupling the controller with a servomotor;
    communications links for controlling a plurality of drive circuits to excite the drive currents in the respective windings;
    wherein the controller is adapted to:
        determine whether a failure mode has occurred, the failure mode being an instantaneous complete or partial failure to generate the demand; and,
        upon detection of a failure mode on a first winding, reshaping the drive currents to the respective windings, to redistribute a demand contribution that is not being produced by the first winding to one or more of the windings that are not in a failure mode.

10. The controller of claim 9 wherein the sensed output and demand are either torque or angular velocity.

11. The controller of claim 9 wherein the sensed output is feedback from a closed feedback loop between the drive circuits and a sensor on the motor output.

12. The controller of claim 9 wherein the failure mode is determined from comparison of demand and output.

13. The controller of claim 9 wherein the failure mode is determined from output of a sensor.

14. The controller of claim 9 wherein the failure mode is one of a complete failure of a winding, a voltage saturation, or a current saturation.

15. The controller of claim 9 wherein the failure mode is one of a plurality of failure modes that can be detected, and the controller is further adapted to identify a different respective redistribution of demand or a method of redistributing the demand, for each failure mode.

16. The controller of claim 9 wherein the controller comprises program instructions for executing a prescribed process to compute difference functions for drive currents applied at each drive circuit to redistribute the demand contribution that is not being produced.

17. The controller of claim 16 wherein the prescribed process comprises solving a model of the motor for a set of current conditions.

18. A method for controlling drive currents to respective windings of a multi-winding brushless motor, the method comprising:
monitoring an output of the motor and a demand of the motor;
determining whether one of a plurality of failure modes that can be detected has occurred, the failure mode being an instantaneous complete or partial failure to generate demand; and,
upon detection of one of the plurality of failure modes on a first winding, reshaping the drive currents to the respective windings, to redistribute a demand contribution that is not being produced by the first winding to one or more of the windings that are not in a failure mode,
where each failure mode is identified with a different respective redistribution of demand.

19. The method of claim 18 wherein the output and demand are either torque or angular velocity.

20. The method of claim 18 wherein monitoring the output is performed with feedback from a closed feedback loop between the drive circuits and a sensor on the motor output.

21. The method of claim 18 wherein the failure mode is determined from comparison of demand and output.

22. The method of claim 18 wherein the failure mode is determined from output of a sensor.

23. The method of claim 18 wherein redistributing the demand contribution that is not being produced comprises performing a prescribed process to compute difference functions for drive currents applied at each drive circuit.

24. The method of claim 23 further comprising a prior, off-line step of computing the prescribed process using a model of the motor.

25. A method for controlling drive currents to respective windings of a multi-winding brushless motor, the method comprising:
monitoring an output of the motor and a demand of the motor;
determining whether a failure mode has occurred, the failure mode being an instantaneous complete or partial failure to generate demand; and,
upon detection of a failure mode on a first winding, reshaping the drive currents to the respective windings, to redistribute a demand contribution that is not being produced by the first winding to one or more of the windings that are not in a failure mode, by performing a prescribed process to compute difference functions for drive currents applied at each drive circuit.

26. The method of claim 25 wherein the output and demand are either torque or angular velocity.

27. The method of claim 25 wherein monitoring the output is performed with feedback from a closed feedback loop between the drive circuits and a sensor on the motor output.

28. The method of claim 25 wherein the failure mode is determined from comparison of demand and output.

29. The method of claim 25 wherein the failure mode is determined from output of a sensor.

30. The method of claim 29 further comprising a prior, off-line step of computing the prescribed process using a model of the motor.

31. A method for controlling drive currents to respective windings of a multi-winding brushless motor, the method comprising:
monitoring an output of the motor and a demand of the motor;
determining whether a failure mode has occurred using output of a sensor, the failure mode being an instantaneous complete or partial failure to generate demand; and,
upon detection of a failure mode on a first winding, reshaping the drive currents to the respective windings, to redistribute a demand contribution that is not being produced by the first winding to one or more of the windings that are not in a failure mode.

32. The method of claim 31 wherein the output and demand are either torque or angular velocity.

33. The method of claim 31 wherein monitoring the output is performed with feedback from a closed feedback loop between the drive circuits and a sensor on the motor output.

34. The method of claim 31 wherein the failure mode is determined from comparison of demand and output.

35. A controller for controlling drive currents to respective windings of a multi-winding brushless motor, the controller comprising:
communications links for receiving a sensed output of the motor and a demand of the motor;
communications links for controlling a plurality of drive circuits to excite the drive currents in the respective windings;
wherein the controller is adapted to:
determine whether a failure mode has occurred, the failure mode being an instantaneous failure to generate the demand, the failure mode being one of a complete failure of a winding, a voltage saturation, or a current saturation; and,
upon detection of a failure mode on a first winding, reshaping the drive currents to the respective windings, to redistribute a demand contribution that is not being produced by the first winding to one or more of the windings that are not in a failure mode.

36. The controller of claim 35 wherein the sensed output and demand are either torque or angular velocity.

37. The controller of claim 35 wherein the sensed output is feedback from a closed feedback loop between the drive circuits and a sensor on the motor output.

38. The controller of claim 35 wherein the communication link for the demand couples the controller with a servomotor.

39. The controller of claim 35 wherein the failure mode is determined from comparison of demand and output.

40. The controller of claim 35 wherein the failure mode is determined from output of a sensor.

41. The controller of claim 35 wherein the failure mode is one of a plurality of failure modes that can be detected, and the controller is further adapted to identify a different respective redistribution of demand or a method of redistributing the demand, for each failure mode.

42. A controller for controlling drive currents to respective windings of a multi-winding brushless motor, the controller comprising:
communications links for receiving a sensed output of the motor and a demand of the motor;
communications links for controlling a plurality of drive circuits to excite the drive currents in the respective windings;
wherein the controller is adapted to:
determine whether one of a plurality of failure modes that can be detected has occurred, the failure mode being an instantaneous complete or partial failure to generate the demand; and,
upon detection of one of the plurality of failure modes on a first winding, reshaping the drive currents to the respective windings, to redistribute a demand contribution that is not being produced by the first winding to one or more of the windings that are not in a failure mode,
where the controller is further adapted to identify a different respective redistribution of demand, or method of redistributing the demand, for each of the plurality of failure modes.

43. The controller of claim 42 wherein the sensed output and demand are either torque or angular velocity.

44. The controller of claim 42 wherein the sensed output is feedback from a closed feedback loop between the drive circuits and a sensor on the motor output.

45. The controller of claim 42 wherein the failure mode is determined from comparison of demand and output.

46. The controller of claim 42 wherein the failure mode is determined from output of a sensor.

47. A controller for controlling drive currents to respective windings of a multi-winding brushless motor, the controller comprising:
communications links for receiving a sensed output of the motor and a demand of the motor;
communications links for controlling a plurality of drive circuits to excite the drive currents in the respective windings;
wherein the controller is adapted to:
determine whether a failure mode has occurred from output of a sensor, the failure mode being an instantaneous complete or partial failure to generate the demand; and,
upon detection of a failure mode on a first winding, reshaping the drive currents to the respective windings, to redistribute a demand contribution that is not being produced by the first winding to one or more of the windings that are not in a failure mode.

48. The controller of claim 47 wherein the sensed output and demand are either torque or angular velocity.

49. The controller of claim 47 wherein the sensed output is feedback from a closed feedback loop between the drive circuits and a sensor on the motor output.

50. The controller of claim 47 wherein the failure mode is determined from comparison of demand and output.

* * * * *